Oct. 9, 1923.                                             1,470,529
D. GERBER
PIPE SUPPORT AND ANCHOR
Filed June 28, 1921

INVENTOR.
Dwight Gerber
by W. T. Doolittle
Attorney.

Patented Oct. 9, 1923.

1,470,529

UNITED STATES PATENT OFFICE.

DWIGHT GERBER, OF PITTSBURGH, PENNSYLVANIA, ASSIGNOR TO NATIONAL VALVE & MANUFACTURING COMPANY, OF PITTSBURGH, PENNSYLVANIA, A CORPORATION OF PENNSYLVANIA.

PIPE SUPPORT AND ANCHOR.

Application filed June 28, 1921. Serial No. 481,001.

*To all whom it may concern:*

Be it known that I, DWIGHT GERBER, a citizen of the United States, residing at Pittsburgh, in the county of Allegheny and State of Pennsylvania, have invented certain new and useful Improvements in Pipe Supports and Anchors, of which the following is a specification.

This invention is for a support for pipes, and particularly for a support for high pressure steam lines in which provision is made for the expansion and contraction of the pipe with changes in the temperature thereof.

In steam lines, particularly high pressure steam lines through which superheated steam is passed, there is a considerable expansion in the length of the pipe. It is therefore the usual practice to anchor the pipe at certain points to direct the expansion in a desired direction to an expansion joint. The pipe must be supported, however, between the anchor and the expansion joint, and the supporting means must allow for the expansive movement. Such pipes must be encased in a heat insulating material. Pipe supports for lines of this kind have heretofore been proposed in which rollers are employed to permit the pipe to expand, but such supports destroy the heat insulating material and do not firmly engage the pipes. Inasmuch as heat losses must be reduced to a minimum in such lines, it is important that the heat insulating material remains intact.

An object of the present invention is to provide a pipe support which may be adjusted to hold the pipe in proper alinement, and which will allow the pipe to expand without danger to the insulation.

A further object of the invention is to provide a support which may be turned at various angles and which may be used for an anchor as well as for a support.

These and other objects will be apparent from the description of my invention in connection with the accompanying drawings, in which.

Figure 1:
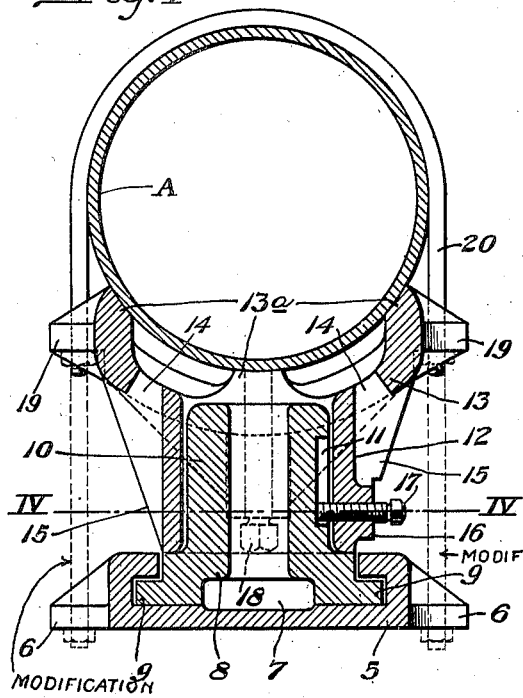
Fig. 1 is a vertical section through the support, showing a pipe clamped thereto.

In the drawings, 5 indicates the base member of the support, and extending from the sides of the base member are lugs 6 having openings therethrough for the passage of anchor bolts. Extending longitudinally of the base 5 is a channel 7 having overhanging or rabbeted sides which form grooves at the sides of the channel.

Slidable within the channel or guideway in the base member 5 is a pedestal 8 having laterally extending portions 9 for engaging in the grooves at the sides of the channel. As shown in Fig. 1, the pedestal is preferably loosely fitted in the channel so that there can be a slight lateral play. The upper part of the pedestal is in the form of a hollow cylindrical extension 10 in which may, if desired, be provided vertically extending grooves 11, but these grooves are not necessary and may be dispensed with, being advantageous only under certain conditions.

Surrounding the cylindrical extension 10 is a sleeve 12 having a saddle 13 formed integrally therewith at its top. The saddle has pipe engaging portions 13$^a$ and preferably has openings 14 therethrough. At 15 are strengthening webs and 16 designate bosses also formed on the sleeve.

Passing through a threaded opening in the bosses are set screws or bolts 17, the inner ends of which are adapted to be forced into engagement with the surface of the cylindrical extension 10 or the groove 11 therein.

Figure 2:
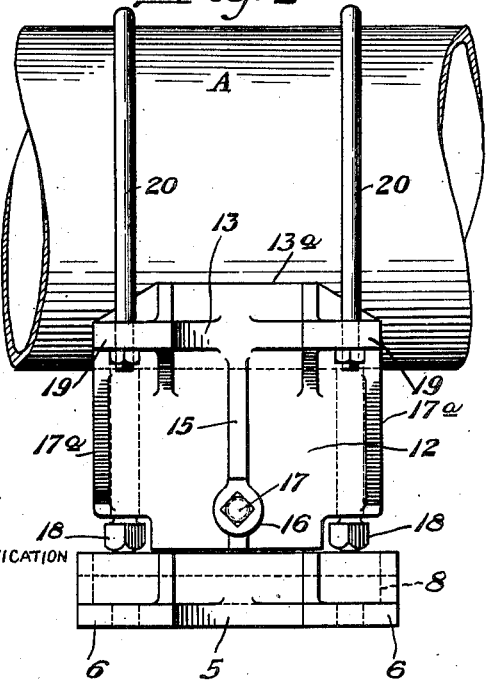
Fig. 2 is a side elevation of the support as shown in Fig. 1.
Figure 3:
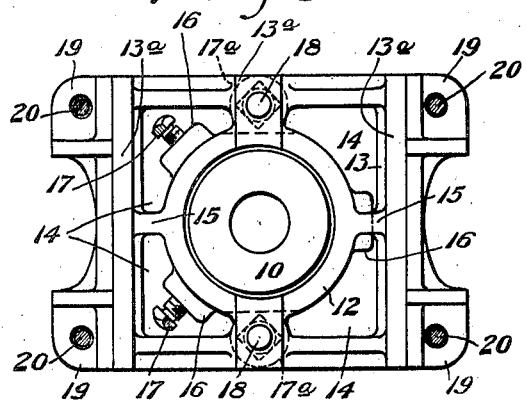
Fig. 3 is a top plan view of the support with the pipe removed.
Figure 4:
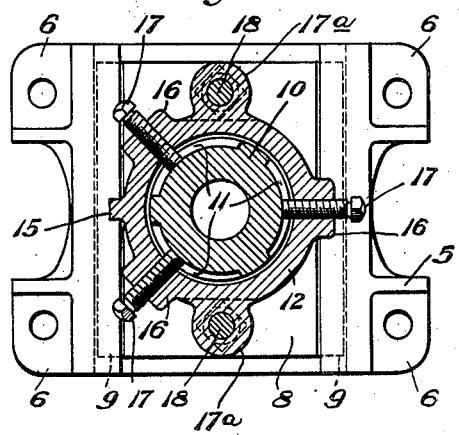
Fig. 4 is a horizontal section on line IV—IV of Fig. 1.

On the sleeve 12 are two laterally projecting vertically extending ribs 17$^a$, the lower ends of which are spaced above the lower end of the sleeve, as shown in Fig. 2. Threaded into holes in these ribs are jack bolts 18, the heads of which are accommodated in the space between the lower ends of the ribs and the base of the pedestal, the heads being adapted to bear against the base of the pedestal or the top of the base member 5. By turning the bolts 18, the sleeve may be raised or lowered. It will be noted that the heads of the bolts are readily accessible.

Projecting from the sides of the saddle are lugs 19 which may be positioned over and in alinement with the lugs 6 on the base 5. These lugs have openings therein through which may be passed the ends of U-bolts or straps 20.

In use, the base 5 is secured by bolts passing through lugs 6 to a supporting structure. The pedestal 8 is then put in place by sliding it in from one end of the channel 7 in base 5. The sleeve 12 with its saddle 13 is then applied, and jack bolts 18 are turned to give the saddle the proper vertical height so that the pipe, when placed thereon, will be properly alined, vertically. The saddle may then be rotated to correspond to the direction in which the pipe extends. For instance, it can be turned so that it is parallel with the longitudinal center of the base, as shown in Fig. 2, or turned to any suitable angle relatively to said axis. Generally, however, the saddle will be turned as shown in Fig. 2. Set screws 17 may then be tightened to hold the saddle at the desired position by clamping it to the pedestal 8.

Figure 5:
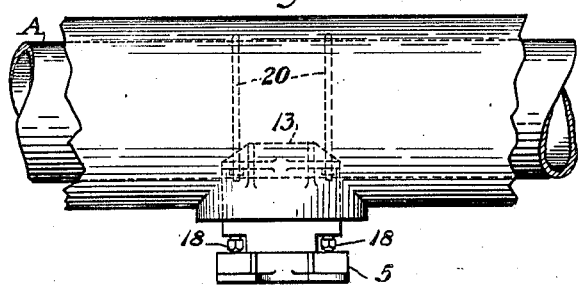
Fig. 5 is a view on a smaller scale showing the support and pipe after the insulating material has been applied.

The pipe A is then clamped in position by U-bolts 20. If desired, additional adjustments may be made after the pipe is in position. The pipe may have the insulation applied thereto before being clamped in the supporting device, but I prefer to clamp the pipe directly to the saddle, and then apply heat insulating material in the form of mortar. This mortar may be worked in through openings 14 and the entire saddle and upper part of the sleeve may be encased, as shown in Fig. 5.

When steam is introduced into the line, and the pipe expands, the movement of the pipe is transmitted to the saddle 13, which in turn transmits motion to the pedestal. The pedestal is free to slide in the base 5, and thereby allow for such movement.

When it is desired to anchor the pipe at a certain point in order to direct the expansion in a given direction toward an expansion joint, the U-bolts 20 are extended down through lugs 6 on base 5 and into the supporting structure. This holds the pedestal 8 from movement and consequently the pipe expands away from the support. For instance, in a stretch of pipe one hundred and sixty feet long, there would be an expansion joint at each end thereof. It would be supported at suitable points, as at every twenty feet. At the point midway between its ends, that is, eighty feet from each end, the support would be used as an anchor. Thus, the expansion would be directed toward both ends of the pipe from the middle. In all the other supports between the ends and the anchor, the pedestals would be freely movable.

Where grooves 11 are provided in the cylindrical projection 10, the saddle is prevented from lifting off even if bolts 17 become loose. This is especially advantageous if it should ever be necessary to invert the support for any reason.

It will be seen that by so constructing the supporting member that one part thereof is movable with the pipe, much of the danger from injury to the insulation is eliminated, especially from such movement of the pipe as occurs when the pipe "jumps" from the presence of water in the line.

What I claim is:

1. A pipe support comprising a base member, and a pipe engaging member slidably and rotatably carried on said base arranged to be encased in heat insulating material with a pipe and move with the pipe which it supports.

2. A pipe support comprising a base member, a pipe engaging member, a member interposed between said base and engaging member and slidably carried on the base, and means for adjusting the pipe engaging member vertically relatively to the base.

3. A pipe support comprising a base member, a pipe engaging member, an intermediate member interposed between said base and engaging member and slidably mounted on the base member, said pipe engaging member rotatably mounted on the intermediate member.

4. A pipe support comprising a base member, a pipe engaging member slidable along the base, said pipe engaging member being arranged to be encased in heat insulating material with a pipe and to move longitudinally and vertically with the pipe which it supports.

5. A pipe support comprising a base, a pipe engaging member slidable on the base, means for clamping a pipe to the pipe engaging member, and means on the base adapted to cooperate with said clamping means to hold the pipe engaging means against relative sliding movement to thereby provide an anchor.

6. A pipe support comprising a base having a guideway therein, a pedestal slidably retained in the guideway, a saddle supporting member carried on the pedestal, a pipe receiving saddle thereon, and means on the saddle supporting means for adjusting the saddle vertically.

7. A pipe support comprising a base having a guideway therein, a pedestal slidably retained in the guideway, a saddle supporting member carried by the pedestal, a saddle on said saddle supporting member, means on the saddle supporting member for adjusting the saddle vertically, and locking means in the saddle supporting member adapted to be forced into engagement with a portion of the pedestal for holding said member against movement relatively thereto.

8. A pipe support comprising a base having a guideway therein, a pedestal slidably retained in the guideway, a sleeve surrounding a portion of the pedestal, a saddle formed at the top of the sleeve, said sleeve having means projecting from the sides thereof in which are threaded jack bolts, the lower ends of said jack bolts being adapted to be projected below the bottom of the sleeve to adjust the sleeve and saddle vertically.

9. A pipe support comprising a base having apertured lugs projecting therefrom, a pipe engaging saddle carried on the base and adjustable vertically relatively to the base, and lugs projecting from the saddle having openings therein adapted to be alined with the apertures in the lugs on the base.

In testimony whereof I affix my signature.

DWIGHT GERBER.